United States Patent
Kington et al.

(10) Patent No.: US 10,294,807 B2
(45) Date of Patent: May 21, 2019

(54) INTER-TURBINE DUCTS

(71) Applicant: HONEYWELL INTERNATIONAL INC., Morris Plains, NJ (US)

(72) Inventors: Harry Lester Kington, Scottsdale, AZ (US); James Neumann, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 406 days.

(21) Appl. No.: 15/159,355

(22) Filed: May 19, 2016

(65) Prior Publication Data

US 2017/0335699 A1 Nov. 23, 2017

(51) Int. Cl.
| | |
|---|---|
| *F01D 9/04* | (2006.01) |
| *F01D 25/24* | (2006.01) |
| *B32B 18/00* | (2006.01) |
| *C04B 35/80* | (2006.01) |
| *F01D 25/16* | (2006.01) |

(52) U.S. Cl.
CPC .............. *F01D 9/041* (2013.01); *B32B 18/00* (2013.01); *C04B 35/80* (2013.01); *F01D 25/162* (2013.01); *F01D 25/246* (2013.01); *C04B 2237/343* (2013.01); *C04B 2237/365* (2013.01); *C04B 2237/38* (2013.01); *C04B 2237/765* (2013.01); *F05D 2300/6033* (2013.01); *Y02T 50/672* (2013.01); *Y02T 50/673* (2013.01)

(58) Field of Classification Search
CPC ................. F01D 9/041–9/042; F05D 2240/80
See application file for complete search history.

(56) References Cited

U.S. PATENT DOCUMENTS

| | | | |
|---|---|---|---|
| 2,332,330 A | 10/1943 | McMahan | |
| 2,857,093 A * | 10/1958 | Warnken | F01D 9/042 415/200 |
| 2,914,300 A * | 11/1959 | Sayre | F01D 9/042 415/135 |
| 4,955,423 A | 9/1990 | Blazek | |
| 5,059,095 A | 10/1991 | Kushner et al. | |
| 5,069,265 A | 12/1991 | Blazek | |
| 5,083,900 A | 1/1992 | Carletti et al. | |
| 5,181,550 A | 1/1993 | Blazek et al. | |
| 5,382,453 A | 1/1995 | Mason | |
| 5,538,796 A | 7/1996 | Schaffer et al. | |
| 6,409,473 B1 | 6/2002 | Chen et al. | |
| 6,495,271 B1 | 12/2002 | Vakil | |
| 6,610,419 B1 * | 8/2003 | Stamm | C23C 28/00 205/184 |
| 6,887,044 B2 | 5/2005 | Fleck et al. | |
| 7,067,447 B2 | 6/2006 | Campbell | |
| 7,114,917 B2 | 10/2006 | Legg | |

(Continued)

*Primary Examiner* — Jason D Shanske
*Assistant Examiner* — Brian O Peters
(74) *Attorney, Agent, or Firm* — Lorenz & Kopf, LLP

(57) ABSTRACT

An inter-turbine duct includes a first annular wall with a ceramic composite material and including a first plurality of layers and a second plurality of layers, the first plurality of layers including a slot extending therethrough; and a first vane with a material of a metal alloy or a ceramic material. The first vane has a first end and a flange extending through the slot with the flange extending away from the first end and being retained between the first plurality of layers and the second plurality of layers of the first annular wall.

18 Claims, 6 Drawing Sheets

(56) References Cited

U.S. PATENT DOCUMENTS

| | | |
|---|---|---|
| 7,229,254 B2 | 6/2007 | Bast et al. |
| 7,452,189 B2 | 11/2008 | Shi et al. |
| 7,510,779 B2 | 3/2009 | Walston et al. |
| 8,182,213 B2 * | 5/2012 | Cheung ................ F04D 29/023 |
| | | 415/115 |
| 9,103,214 B2 * | 8/2015 | McCaffrey ............. B29C 70/00 |
| 9,427,834 B2 * | 8/2016 | Fremont ................. B29B 11/16 |
| 2004/0058201 A1 | 3/2004 | Merrill et al. |
| 2005/0268463 A1 | 12/2005 | Ouellette et al. |
| 2006/0120874 A1 | 6/2006 | Burke et al. |
| 2008/0116614 A1 | 5/2008 | Morrison et al. |
| 2013/0052030 A1 * | 2/2013 | McCaffrey ............. B29C 70/00 |
| | | 416/241 B |
| 2013/0209261 A1 * | 8/2013 | Renard ................... F01D 5/282 |
| | | 416/213 R |

* cited by examiner

INTER-TURBINE DUCTS

TECHNICAL FIELD

The inventive subject matter generally relates to engines, and more particularly relates to inter-turbine ducts for use in turbine sections of engines.

BACKGROUND

A gas turbine engine may be used to power various types of vehicles and systems. A particular type of gas turbine engine that may be used to power aircraft is a turbofan gas turbine engine. A turbofan gas turbine engine may include, for example, a fan section, a compressor section, a combustor section, a turbine section, and an exhaust section. The fan section induces air from the surrounding environment into the engine and accelerates a fraction of the air toward the compressor section. The remaining fraction of air is accelerated into and through a bypass plenum, and out the exhaust section.

The compressor section, which may include a high pressure compressor and a low pressure compressor, raises the pressure of the air it receives from the fan section to a relatively high level. The compressed air then enters the combustor section, where an annular wall of fuel nozzles injects a steady stream of fuel into a plenum. The injected fuel is ignited to produce high-energy compressed air. The air then flows into and through the turbine section causing turbine blades therein to rotate and generate energy. This energy is used to power the fan and compressor sections. The air exiting the turbine section is exhausted from the engine via the exhaust section, and the energy remaining in the exhaust air aids the thrust generated by the air flowing through the bypass plenum.

In some configurations, the turbine section includes a high pressure turbine section and a low pressure turbine section. An inter-turbine duct may be interposed between the two sections and may include a plurality of radially inwardly extending vanes adapted to guide airflow from the high pressure turbine section into the low pressure turbine section. Conventionally, the vanes and at least part of the inter-turbine duct (e.g., an inner wall or an outer wall of the duct) are cast as a single piece from high-temperature materials, such as nickel-based superalloys. To protect structures surrounding the inter-turbine duct from excessive heat, an insulation blanket is typically disposed around inner diameter of the inter-turbine duct. In other configurations, air flowing through the bypass plenum may be bled into cavities surrounding the inter-turbine duct. However, as the demand for more efficient engines has increased, the demands for increased engine operating temperatures and decreased engine weight have increased as well. As a result, use cooling air flow from the bypass plenum may not provide sufficient cooling for the inter-turbine duct.

Accordingly, it is desirable to have an improved inter-turbine duct, which may have improved performance over conventional inter-turbine ducts when exposed to high engine operating temperatures. In addition, it is desirable for the improved inter-turbine duct to be capable of being retrofitted into existing engines. Moreover, it is desirable for the improved inter-turbine duct to be relatively simple and inexpensive to manufacture. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In accordance with an exemplary embodiment, an inter-turbine duct includes a first annular wall with a ceramic composite material and including a first plurality of layers and a second plurality of layers, the first plurality of layers including a slot extending therethrough; and a first vane with a material of a metal alloy or a ceramic material. The first vane has a first end and a flange extending through the slot with the flange extending away from the first end and being retained between the first plurality of layers and the second plurality of layers of the first annular wall.

In accordance with an exemplary embodiment, an inter-turbine duct includes a first annular wall including a first plurality of layers and a second plurality of layers each with a first ceramic material, the first plurality of layers including a plurality of slots extending therethrough. The duct further include a second annular wall with a ceramic material and including a plurality of openings extending between an inner surface and an outer surface of the second annular wall. The duct further includes a plurality of vanes extending between the first annular wall and the second annular wall, each vane having a material of a metal alloy or a ceramic material, each vane having a first end, a second end, and a flange. The second end of each vane extends through a corresponding opening of the plurality of openings of the second annular wall. The flange of each vane extends through a corresponding slot of the plurality of slots. The flange of each vane extends away from the first end of a corresponding vane and being retained between the first plurality of layers and the second plurality of layers of the first annular wall.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

The inventive subject matter relates to inter-turbine ducts that may be employed in high temperature applications in which separate systems for cooling a turbine section may be omitted or cooling of the turbine section may be minimal. In particular, the inter-turbine ducts may include first and second annular walls that extend axially between two turbine stages. One or more of the annular walls comprises a ceramic composite. A plurality of vanes extends between the two annular walls, and each vane may include an end having a flange extending away from the vane. The flange may be retained between multiple layers of the first annular wall. By including first and/or second annular walls that include ceramic materials, where one annular wall serves as an inner wall and the other annular wall serves as an outer wall, the inter-turbine ducts may withstand operating temperatures that are higher than those that conventional inter-turbine ducts are designed to withstand. In any case, the inventive subject matter may be implemented into any type of engine in which an inter-turbine duct may be subjected to high operating temperatures. One example of such an engine is a turbofan jet engine.

Figure 1:
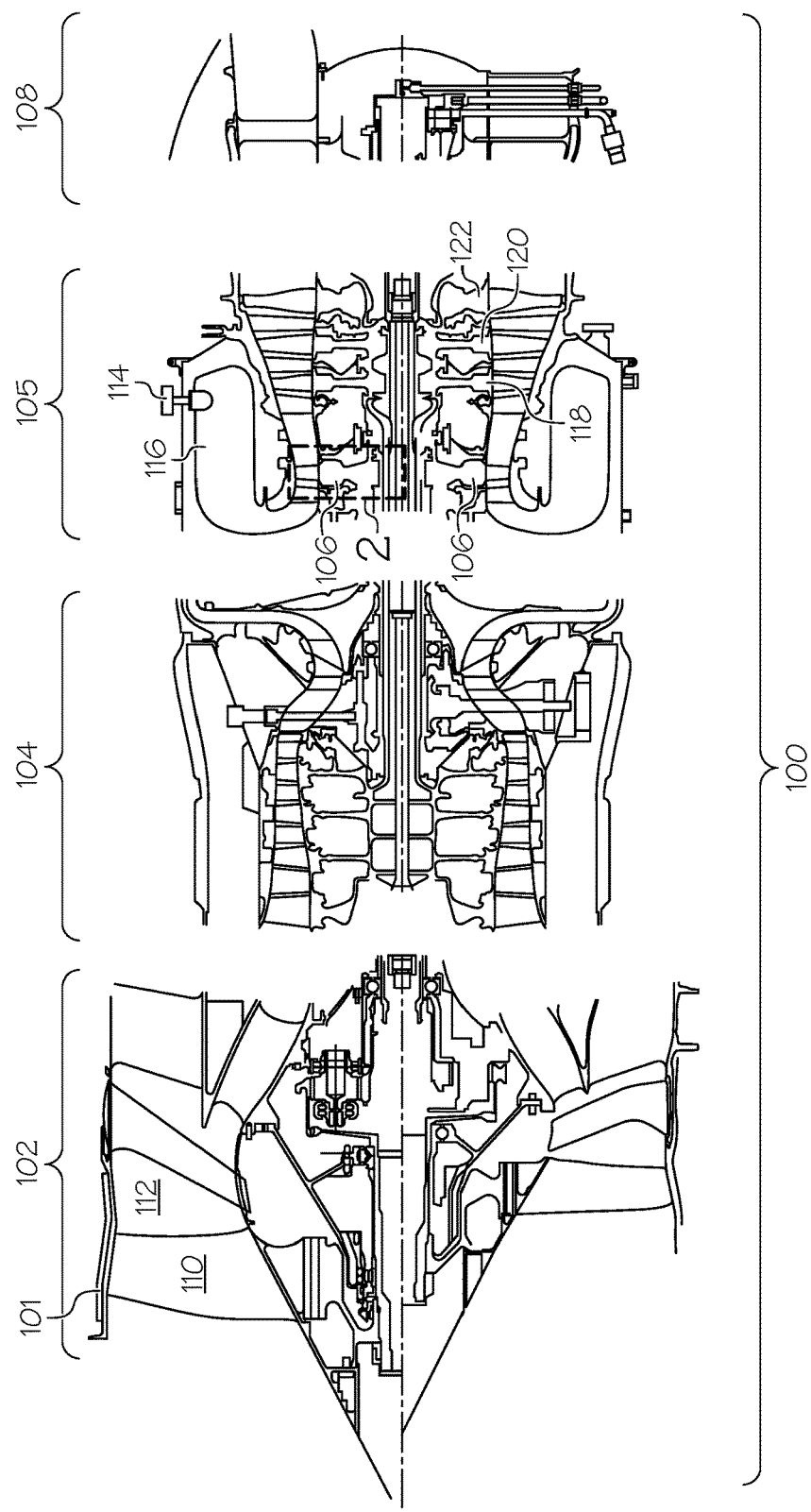
FIG. 1 is a partial cross-sectional side view of a turbofan jet engine, according to an embodiment.

FIG. 1 is a partial cross-sectional side view of a turbofan jet engine 100, according to an embodiment. The turbofan jet engine 100 is disposed in an engine case 101 and includes a fan section 102, a compressor section 104, a combustor and turbine assembly 105, and an exhaust section 108. The fan section 102 is positioned at the front, or "inlet" section of the engine 100, and includes a fan 110 that induces air from the surrounding environment into engine 100. The fan section 102 accelerates a fraction of the air toward the compressor section 104, and a remaining fraction is accelerated into and through a bypass 112, and out the exhaust section 108. The compressor section 104 raises the pressure of the air it receives to a relatively high level.

The high-pressure compressed air enters combustor and turbine assembly 105, where an annular wall of fuel nozzles (not shown) injects fuel into a combustor 116. Combustion is initiated by an ignitor 114 which ignites the fuel in the high-pressure air to significantly increase the thermal energy of the air. This high-temperature, high-pressure air flows into a cooled high pressure turbine stage 106 and into un-cooled low pressure turbine assemblies 118, 120, 122, causing the turbines to rotate as air flows over radially mounted turbine blades, thereby converting thermal energy from the air into mechanical energy. Although three low pressure turbine assemblies are shown in FIG. 1, fewer or more assemblies may be included in other embodiments.

The mechanical energy generated in the low pressure turbine assemblies 118, 120, 122 is used to power other portions of engine 100, such as the fan section 102 and axial stages of the compressor section 104. Air exiting the last turbine assembly 122 then leaves the engine 100 via the exhaust section 108. Energy remaining in the exhaust air augments thrust generated by the air flowing through the bypass 112.

Figure 2:
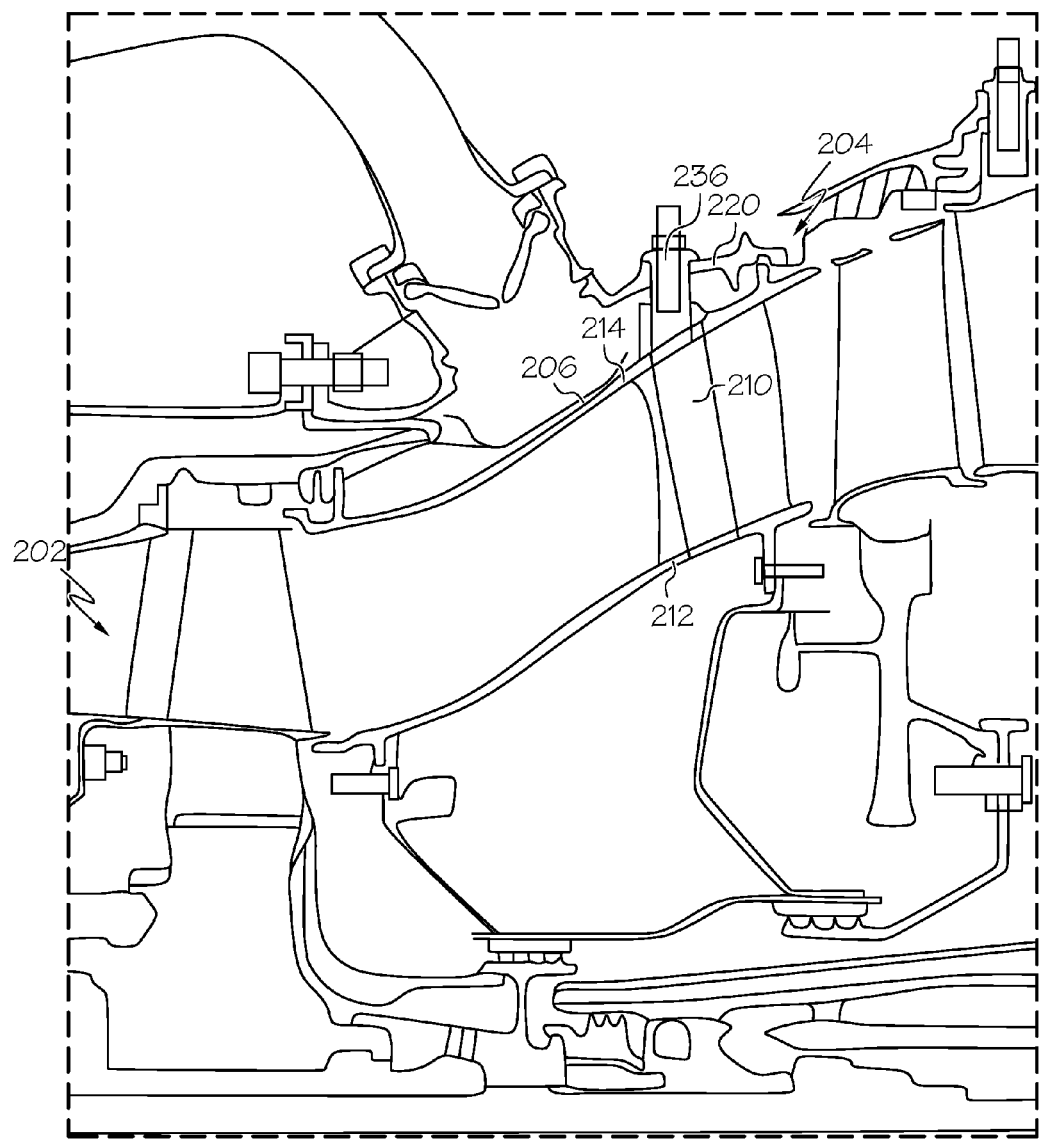
FIG. 2 is a close-up, cross-sectional view of a portion of the turbofan jet engine of FIG. 1 indicated by dotted box 2, according to an embodiment.

FIG. 2 is a cross-sectional view of a portion of the turbofan jet engine 100 of FIG. 1 indicated by dotted box 2, according to an embodiment. The portion of the turbofan jet engine 100 includes an aft portion of a high pressure turbine stage 202 and a portion of a low pressure turbine stage 204. In an embodiment, an inter-turbine duct 206 extends between the two turbine stages 202, 204 and includes a plurality of vanes 210. The inter-turbine duct 206 is annular and includes an inner annular wall 212 and an outer annular wall 214, in an embodiment. Generally, both the inner and outer annular walls 212, 214 may be cone-shaped, in an embodiment. In another embodiment, the inner and outer annular walls 212, 214 may be concentric. In other embodiments, the inner and outer annular walls 212, 214 alternatively may be cylindrical or another shape depending on particular configurations and dimensions of the high and low pressure turbine stages 202, 204. The vanes 210 extend between the inner and outer annular walls 212, 214. Although only one vane 210 is shown in FIG. 2, additional vanes are disposed circumferentially around the inter-turbine duct 206.

To allow inter-turbine duct 206 to operate adequately in high engine operating temperature environments, at least a portion of the inter-turbine duct 206 may comprise ceramic composite materials. In another embodiment, the vanes 210 may comprise ceramic composite materials and/or metal alloy materials. In accordance with an embodiment, a suitable ceramic composite material from which one or both of the inner and outer annular walls 212, 214 and/or one or more of the vanes 210 may include a composite including a reinforcement phase and a matrix phase. The reinforcement phase may include a plurality of reinforcement fibers that form a fabric to provide a structure of the composite for enhancing the tensile and flexural strength properties of the composite. The matrix phase impregnates the reinforcement fabric and bonds the fibers and layers of fabric together to enhance strength properties of the composite. As described below, these phases may be implemented by applying the material in the appropriate location and sintering at a relatively low temperature. In this regard, the ceramic composites may include but are not limited to, aluminum oxide ceramic composites, and silicon carbide materials. For example, the ceramic composites may be formed by a suitable ceramic fiber (e.g., carbon, silicon carbide (SiC), alumina and the like) embedded in a ceramic matrix (e.g., carbon, silicon carbide (SiC), alumina and the like). In some embodiments, the vanes 210 may comprise metal alloy materials, such as nickel-based superalloys, cobalt-based superalloys or other superalloys.

Figure 3:
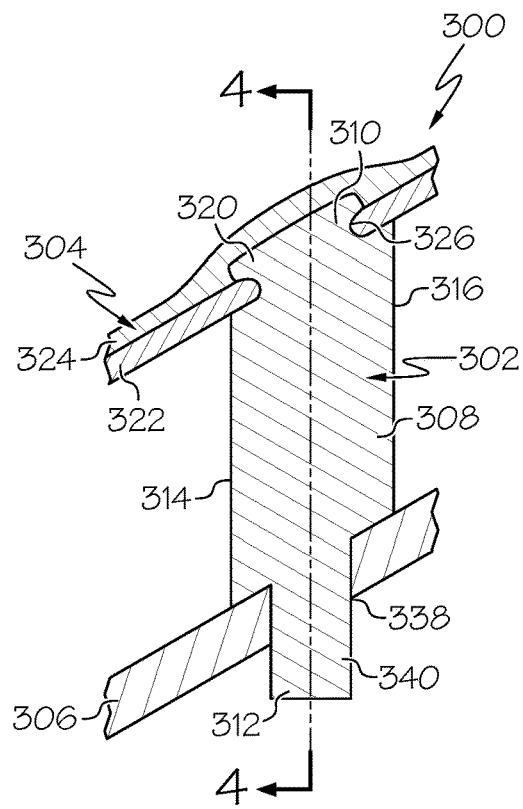
FIG. 3 is a side cross-sectional view of a portion of an inter-turbine duct, according to an embodiment.
Figure 4:
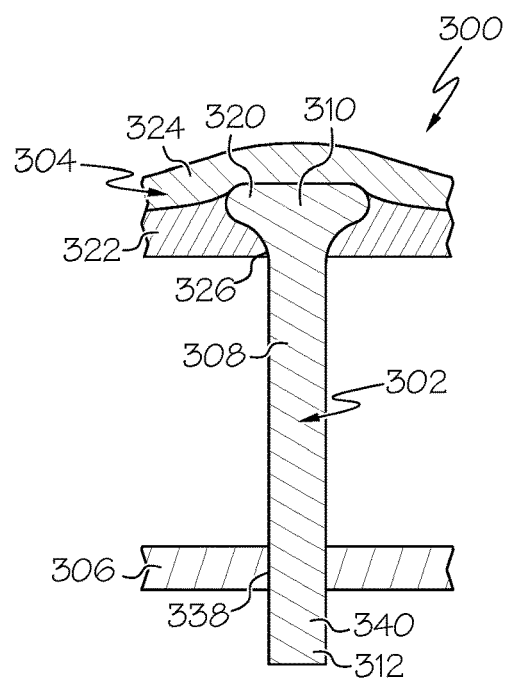
FIG. 4 is a cross-sectional view of the portion of the inter-turbine duct of FIG. 3 taken along line 4-4, in accordance with an embodiment.

FIG. 3 is a side cross-sectional view of an inter-turbine duct 300, and FIG. 4 is a cross-sectional view of a portion of the inter-turbine duct 300 of FIG. 3 taken along line 4-4, in accordance with an embodiment. With reference to FIGS. 3 and 4, in an embodiment, the inter-turbine duct 300 includes a vane 302, a first annular wall 304 (only a portion of which is shown), and second annular wall 306 (only a portion of which is shown). The vane 302 may comprise a metal alloy material or a ceramic composite described above. In accordance with an embodiment, the vane 302 may be formed by casting or growth from a seed crystal. In another embodiment, plies of ceramic composite fabric may be laid up within a mold, and the laid-up plies may be sintered to form the vane 302. In still another embodiment, the vane 302 may have a portion that is cast from a metal alloy or ceramic composite material and may have a portion that comprises plies of ceramic composite fabric.

In an embodiment, the vane 302 includes a main body 308, a first end 310, and a second end 312. The main body 308 may have a height that is sufficient to span a majority of the distance between the first and second annular walls 304, 306. In other embodiments, the height may be greater or less than the aforementioned range. To provide a sufficient surface area for directing airflow through the inter-turbine duct 300 as desired, the main body 308 also generally extends from a first edge 314 to a second edge 316, either of which may be contoured to serve as leading or trailing edges. In an embodiment, a length between the first edge 314 to the second edge 316 may longer or shorter than the height of the main body 308.

The first end 310 of the vane 302 is configured to be retained within the first annular wall 304. In an embodiment, the first end 310 includes a flange 320 that extends outwardly from the first end 310. According to an embodiment, the flange 320 may be rectangular, ovular, circular or another shape and is suitably dimensioned to be retained within the first annular wall 304. To retain the flange 320 within the first annular wall 304, the first annular wall 304 may comprise a first plurality of layers 322 and a second plurality of layers 324. The first plurality of layers 322 makes up an inner portion of the first annular wall 304 and includes a slot 326 having dimensions that are smaller than those of the main body 308 of the vane 302. The first end 310 of the vane 302 extends through the slot 326 in the first plurality of layers 322 so that the flange 320, which has dimensions that are larger than those of the slot 326, is disposed on one side of the first annular wall 304 between the first and second pluralities of layers 322, 324, and the main body 308 is disposed on an opposite side of the first annular wall 304.

To provide sufficient structural integrity to the first annular wall 304 to thereby minimize relative movement of the vane 302, each plurality of layers 322, 324 may comprise a number of layers. In an embodiment, fewer layers may be included depending on the material selected for use as the ceramic composite material. In some embodiments, all of the layers may comprise the same ceramic composite material. In other embodiments, the first plurality of layers 322 may comprise a first ceramic composite material, and the second plurality of layers 324 may comprise a second ceramic composite material. In still another embodiment, one or both of the plurality of layers 322, 324 may comprise two or more ceramic composite materials. In yet another embodiment, one or both of the plurality of layers 322, 324 may be formed from a metal alloy and a ceramic composite material.

The second end 312 of the vane 302 extends through an opening 338 in the second annular wall 306. In an embodiment, the second end 312 may include a post 340 that may generally extend along the same axis as the main body 308. In another embodiment, the post 340 may have smaller and/or different dimensions and/or shape than the main body 308. For example, a portion of the post 340 may have a cylindrical cross-sectional shape or another shape. To accommodate thermal expansion of the vane 302, the second end 312 of the vane 302 and the opening 338 of the second annular wall 306 may form a slip joint, in an embodiment. Other embodiments may include other types of joints formed between the second end 312 of the vane 302 and the opening 338 of the second annular wall 306.

The second annular wall 304 may comprise a ceramic composite material, in an embodiment. For example, the second annular wall 304 may include a plurality of layers formed with a ceramic composite material. In an embodiment, more or fewer layers may be included depending on the material selected for use as the ceramic composite material. In some embodiments, all of the layers may comprise the same ceramic composite material. In other embodiments, the plurality of layers may comprise two or more ceramic composite materials. In still another embodiment, the second annular wall 304 may be cast or formed from a metal alloy. In yet another embodiment, the second annular wall 304 may be formed from a metal alloy and a ceramic composite material.

Generally, a majority of the plurality of vanes (e.g., vanes 210) included in the inter-turbine duct (e.g., assembly 206) includes the above-described configuration. However, to further secure the inter-turbine duct within the engine (e.g., engine 100), the vanes may include additional features.

Hollow vanes can also be used to permit passage of services or cooling air. Retention methods other than those illustrated may be used. Clamped flanges that permit radial slip, guided features that permit radial relative displacement, and other configurations may be used in conjunction with the configuration described herein.

As such, generally, the outer duct wall captures the retention feature on the outer diameter of the airfoil and the inner wall will form a guided slip joint. The aerodynamic forces on the vanes will be reacted by the captured features in the CMC end walls. Three to five of the vanes could incorporate a feature which extends through the outer wrap of the outer duct wall to position and react the loads of the assembly. This configuration accommodates relative radial displacement between the motion to accommodate temperature and thermal expansion between the supporting structure and the duct while supporting axial loads. Accurate centering and axial position is also provided.

Figure 5:
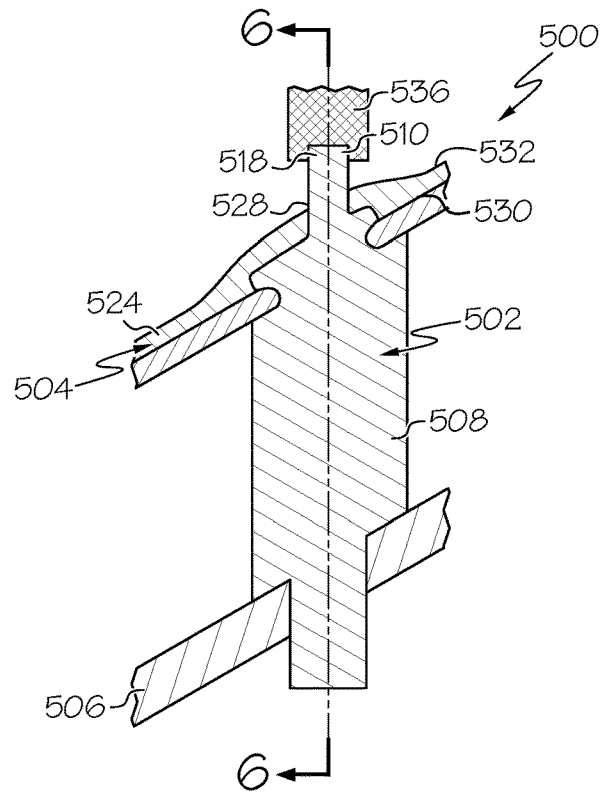
FIG. 5 is a side cross-sectional view of a portion of an inter-turbine duct, according to another embodiment.
Figure 6:
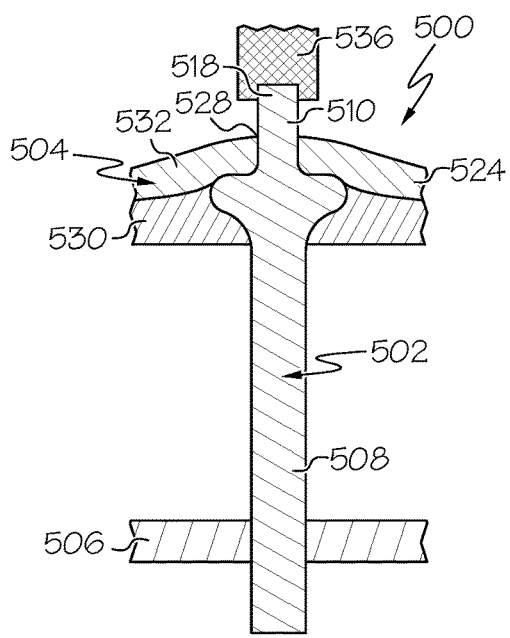
FIG. 6 is a cross-sectional view of the portion of the inter-turbine duct of FIG. 5 taken along line 6-6, in accordance with an embodiment.

FIG. 5 is a side cross-sectional view of a portion of an inter-turbine duct 500, and FIG. 6 is a cross-sectional view of the portion of the inter-turbine duct 500 of FIG. 5 taken along line 6-6, in accordance with an embodiment. Here, the inter-turbine duct 500 includes a vane 502, a first annular wall 504, and a second annular wall 506. The vane 502 may be similar in configuration to vane 302 of FIGS. 3 and 4, except that a first end 510 of the vane 502 includes a post 518 and extends through a corresponding opening 528 formed between inner and outer surfaces 530, 532 of a second plurality of layers 524 making up an outer portion of the first annular wall 504. According to another embodiment, the post 518 may generally extend along the same axis as a main body 508 of the vane 502. In another embodiment, the post 518 may have smaller and/or different dimensions and/or shape than the main body 508. For example, a portion of the post 518 may be cylindrical or have another shape. In some embodiments, the post 518 may be further configured to correspond to a capture feature 236 (FIG. 2) or 536 (shown in phantom in FIGS. 5 and 6) extending from an engine case 220 (FIG. 2). For example, the post 518 may have a cylindrical shape that is received by a cylindrical space defined by the capture feature 536.

In accordance with an embodiment, one or more of the vanes of the plurality of vanes 210 (FIG. 2) may be configured to be received by the capture feature 236, 536. For example, three such vanes may be included and each may be interposed between two vanes configured according to the description associated with FIGS. 3 and 4. In other embodiments, fewer or more vanes having capture features 236, 536 may be included.

Figure 7:
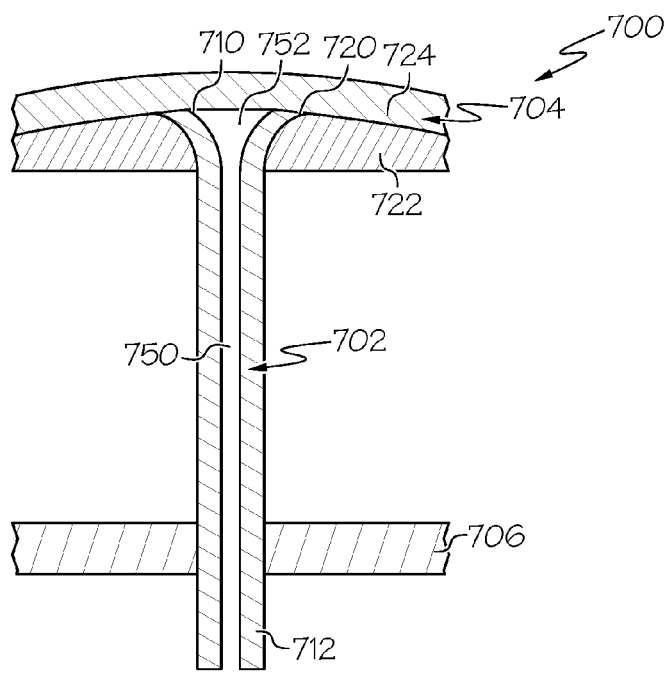
FIG. 7 is a cross-sectional view of a portion of an inter-turbine duct, in accordance with still another embodiment.

FIG. 7 is a cross-sectional view of a portion of an inter-turbine duct 700, in accordance with another embodiment. In this embodiment, the portion of inter-turbine duct 700 includes first and second annular walls 704, 706 that are configured in a manner similar to that described above for first and second annular walls 304, 306 and 504, 506. However, the inter-turbine duct 700 includes a vane 702 that is at least partially comprised of a ceramic composite material. For example, the vane 702 may be formed such that an internal cavity 750 extends from a first end 710 of the vane to a second end 712 of the vane 702. The internal cavity 750 may have an opening 752 on the first end 710 of the vane 702. A flange 720 extends from the first end 710 of the vane 702 to define at least a portion of the first end 710 of the vane. Similar to above-described embodiments, the flange 720 is retained between a first plurality of layers 722 and a second plurality of layers 724 making up the first annular wall 704. The second end 712 of the vane 702 extends through the second annular wall 706 in a manner similar to that described above.

Figure 8:
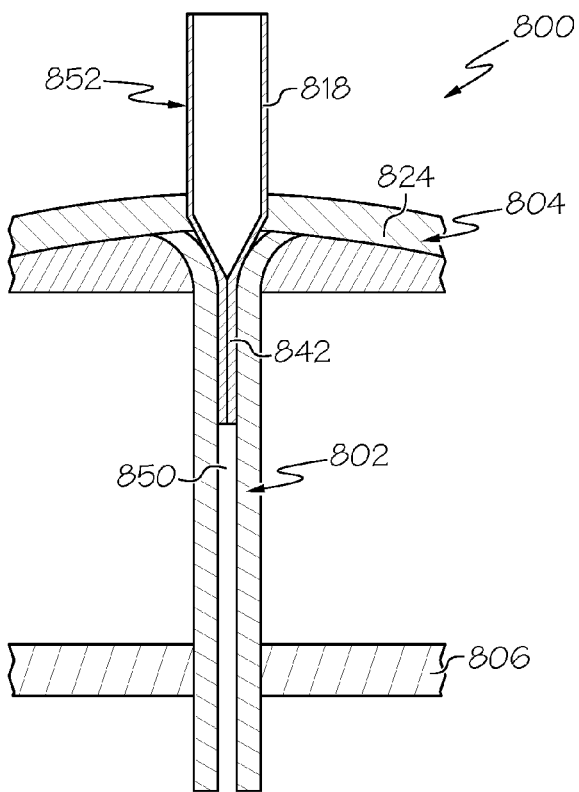
FIG. 8 is a cross-sectional view of a portion of an inter-turbine duct, in accordance with still yet another embodiment.

FIG. 8 is a cross-sectional view of a portion of an inter-turbine duct 800, in accordance with still another embodiment. Here, the inter-turbine duct 800 is configured to correspond to a capture feature that may be provided on an engine. In such case, the inter-turbine duct 800 includes a vane 802 and first and second annular walls 804, 806 that are configured in a manner similar to that described above for vane 702 and first and second annular walls 704, 706, except that a retention insert 852 is included. In an embodiment, the retention insert 852 includes a post 818 and an insertion section 842. The post 818 is configured to correspond to a capture feature 236 (FIG. 2) or 536 (shown in phantom in FIGS. 5 and 6) extending from an engine case 220 (FIG. 2) and extends through a second plurality of layers 824 of the first annular wall 804. For example, the post 818 may have a cylindrical shape that is received by a cylindrical space defined by the capture feature 536. The insertion section 842 is configured to be disposed at least partially within an internal cavity 850 of the vane 802 and is dimensioned such that its outer surface corresponds to an inner surface defining the internal cavity 850. Although the insertion section 842 is shown as extending partially into the internal cavity 850, the insertion section 842 may extend an entire length of the internal cavity 850 in other embodiments.

For applications in which metallic airfoils do not have adequate temperature capability, those described in this embodiment with ceramic composite airfoils such as SiC/SiC typically provide this capability. The layup of the outer portion of the vane, beyond the gas path would be deformed prior to final matrix infiltration and sintering to yield the retention feature. This process yields a natural taper to the ends of the retention feature which enhances the joint with the oxide/oxide wraps. This configuration would typically employ the interfaces with adjacent hardware described in the previously and could be used as hollow vanes to permit the passage of services or cooling air.

Although the first annular walls 304, 504, 704, 804, are depicted as forming an outer annular wall, and the second annular walls 306, 506, 706, 806 are depicted as forming an inner annular wall, other embodiments may include the first annular wall 304, 504, 704, 804 as the inner annular wall and the second annular wall 306, 506, 706, 806 as the outer annular wall. As such, the capture features and joints may have reversed positions.

Figure 9:
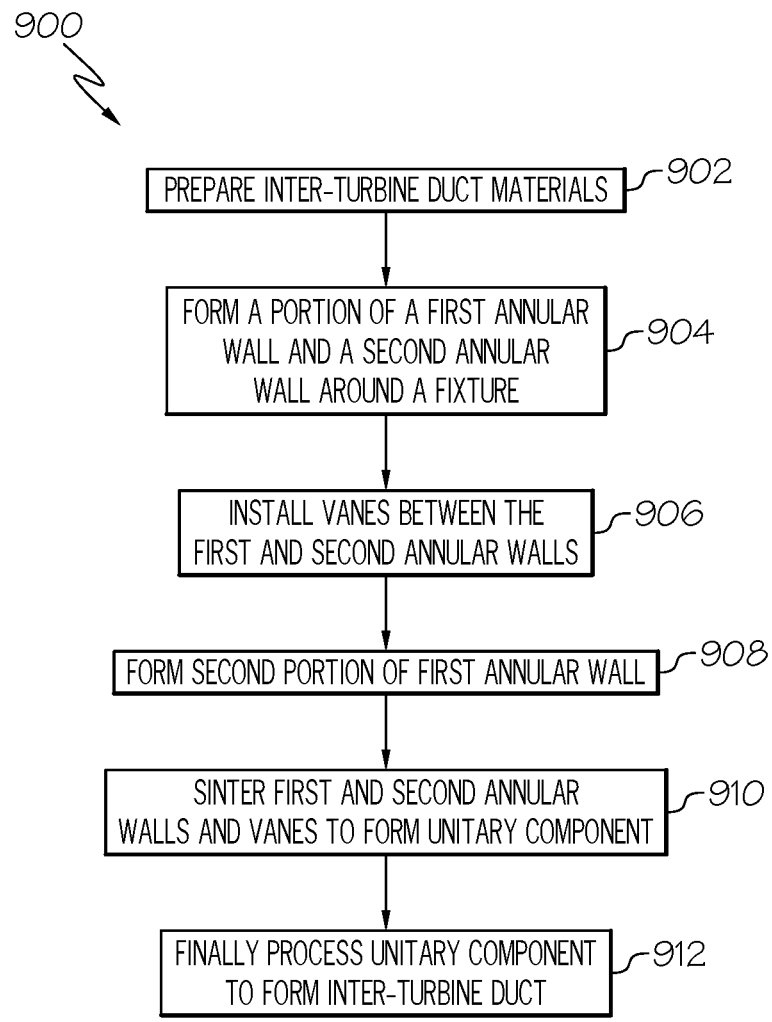
FIG. 9 is a flow diagram of a method of forming an inter-turbine duct, according to an embodiment.

FIG. 9 is a flow diagram of a method 900 of forming an inter-turbine duct, according to an embodiment. Inter-turbine duct materials are prepared, step 902. In an embodiment, one or more vanes are obtained or formed (e.g., cast or fabricated from metal alloys and/or laid up using a plurality of plies of ceramic composite material) according to the configurations described above (e.g., vanes 210 of FIG. 2, vane 302 of FIGS. 3 and 4, vane 502 of FIGS. 5 and 6, vane 702 of FIG. 7, and vane 802 of FIG. 8). Additionally, a fixture having an outer diameter surface and an inner diameter surface, each configured to correspond to a desired shape of first and second annular walls (e.g., walls 304, 306 of FIGS. 3 and 4, walls 504, 506 of FIGS. 5 and 6, walls 704, 706 of FIG. 7, and walls 804, 806 of FIG. 8) of the inter-turbine duct, may be obtained.

A portion of a first annular wall and a second annular wall are formed around the fixture, step 904. In an embodiment, plies of ceramic composite material may be used to line the inner and outer diameter surfaces of the fixture. According to an embodiment, the number of plies lining the fixture surfaces may depend on a desired resultant thickness of the first and second annular walls. In another embodiment, the thickness of the annular walls may depend on whether the inner annular wall is employed to retain a flange of the vane or whether the outer annular wall is employed to retain the flange of the vane. For example, in either case, the annular wall designated to include the vane flange may be formed such that a first plurality of plies are laid around the fixture surface. For ease of understanding, the annular wall designated to include the vane flange will be referred to as the "first annular wall". In other embodiments, the first annular wall may comprise an inner annular wall of the inter-turbine duct. In another embodiment, the first annular wall may comprise an outer annular wall of the inter-turbine duct.

Vanes are installed between the first and second annular walls, step 906. In an embodiment, slots are formed through the first annular wall and openings are formed in the second annular wall. In accordance with an embodiment, the slots and openings are formed at radial locations around the first and second annular walls at which corresponding vanes may be disposed. Accordingly, the number of slots and the number of openings correspond to a total number of vanes to be included in the inter-turbine duct. According to an embodiment, the slots and openings may be machined into the first and/or the second annular walls.

Each vane is placed between a corresponding slot and opening such that a main body of the vane is disposed on one side of the first annular wall and a flange is disposed on a second side of the first annular wall.

Separator fixtures may be employed to prevent the vanes from moving relative to the annular walls. In an embodiment, a separator fixture may be disposed between adjacent vanes.

Next, a second portion of the first annular wall is formed to retain the vanes in position, step 908. For example, a second plurality of layers is applied over the first annular wall and over at least a portion of the flanges of the vanes. In an embodiment, the flanges of the vanes are completely covered by the second plurality of layers. In another embodiment in which a post extends from the vanes, the second plurality of layers may be laid such that an opening is formed through which the post can extend. In still another embodiment in which the vane includes an internal cavity and a retention insert is to be included, the second plurality of layers may be configured to include corresponding openings for a post section of the retention insert to extend. In other embodiments, more or fewer layers may be included. In another embodiment, if included, the retention insert is inserted into the internal cavity of the vane.

The first and second annular walls and the vanes extending between the annular walls are sintered to form a unitary component, step 910. In an embodiment, the fixture, and, if included, the retention inserts and separator fixtures, are also included in the sintering process. Sintering may be performed by subjecting the inter-turbine duct structures to firing temperatures that are above an anticipated operating temperature of the inter-turbine duct. In still another embodiment in which the vanes comprise a single crystal superalloy, the firing temperatures may be greater than the anticipated operating temperature of the inter-turbine duct and less than a solutioning temperature of the single crystal superalloy. After sintering, the fixtures may be removed.

The materials selected may depend on the desired operating conditions. As examples, for engines in which the inter-turbine temperatures are in the range of 2100° F. or less, such as 1650° F., alumina based oxide/oxide ceramic composites with the higher temperature fiber typically have adequate structural capability and cost advantages relative to higher temperature ceramic composite systems such as SiC/SiC. Firing temperatures of these systems are typically in the in the range of 2250 to 2300 F, well below the solution heat treat temperatures of the bulk of single crystal superalloys. This would enable encapsulation of single crystal superalloy elements into the CMC structure prior to firing without damaging the properties. The alumina based oxide/oxide ceramics also have another unique property for this application. Their thermal conductivity is on the order of a tenth of that of a nickel base superalloy. The thermal conductivity is similar to that of the thermal barrier coatings and insulations currently used to reduce the conductance of heat from the gas path of a gas turbine to the surrounding structures and cooling air.

The firing temperature sets the ceramic geometry of the ceramic. At the firing temperature, the metallic is experiencing thermal expansion greater than that at the maximum operating temperature. The ceramic has a thermal expansion lower than that of the metallic this result in an interface with a small clearance at operating conditions and a larger clearance at room temperature. With multiple vanes, the small clearance in individual joints permits movement to preclude excessive thermal strains, but provides the restraint to maintain system alignment. In addition the clearance also accommodates transient thermal differences without excessive strains.

The unitary component may undergo final processing with any suitable process to form the inter-turbine duct, step 912. Examples include stabilization and aging heat treatments.

Accordingly, the concepts discussed above may combine the capability of a single crystal superalloy, oxide dispersion strengthened, nitride strengthen, or similar metallic airfoil in conjunction with oxide/oxide ceramic composite end walls to provide a configuration which will provide the required high temperature strength and reduced thermal conductivity to avoid cooling of the duct walls and minimize insulation requirements.

The concepts outlined above can also be applied to the lower cost family alumina based oxide/oxide ceramic composites with the lower temperature fiber. At the appropriate firing and use temperatures, a large range of lower cost materials may be used for the attachment and/or interface elements. If higher temperature applications are desired, the SiC/SiC ceramic composites may be used. Embodiments discussed above may also be applicable to rear bearing support gas path elements, tip shrouds, and the like for attachment/interface configurations that may otherwise provide challenges with respect to wear and relative motion from thermal expansion differences and the complexity of fabrication. Exemplary embodiments address this issue with advantages with cost, usable life, maintainability, and weight.

By forming at least a portion of the inter-turbine duct from composite materials and by retaining a portion of a vane within a portion of the duct, the inter-turbine duct may be employed in applications in which exposure to high engine operating temperatures may be required. Moreover, by including the composite material inter-turbine ducts in some engine configurations, insulation blankets may be omitted from such engine configurations. Additionally, the inter-turbine duct may be capable of being retrofitted into existing engines and may be simpler and less expensive to manufacture than conventional inter-turbine ducts.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An inter-turbine duct, comprising:
a first annular wall including a first plurality of layers and a second plurality of layers, each of the first plurality of layers and the second plurality of layers composed of a ceramic composite material, the first plurality of layers defining a slot that extends through the first plurality of layers;
a second annular wall including a plurality of layers and an opening defined through the plurality of layers; and
a first vane comprising a material selected from a group consisting of a metal alloy and a ceramic material, the first vane having a first end, a second end opposite the first end, a post that extends outwardly from the second end of the first vane and a flange that extends outwardly from the first end of the first vane, the flange extending through the slot defined in the first plurality of layers, the flange is retained between the first plurality of layers and the second plurality of layers of the first annular wall and the post of the second end of the first vane extends through the opening of the second annular wall such that a slip joint is formed between the post and the opening of the second annular wall.

2. The inter-turbine duct of claim 1, wherein the first annular wall is an outer annular wall.

3. The inter-turbine duct of claim 1, wherein the first annular wall is an inner annular wall.

4. The inter-turbine duct of claim 1, wherein the first end of the first vane includes a post that extends from the flange, the second plurality of layers of the first annular wall defines an opening and the post extends through the opening defined in the second plurality of layers of the first annular wall and radially away from the first annular wall, the post configured to be received within a cylindrical space defined by a portion of an engine case.

5. The inter-turbine duct of claim 1, wherein the first vane includes an internal cavity that extends from the first end of the first vane to the second end of the first vane, the internal cavity having an opening at the first end of the first vane, and the flange defines at least a portion of the first end of the first vane.

6. The inter-turbine duct of claim 5, further comprising a retention insert disposed at least partially within the internal cavity of the first vane and extending through an opening defined in the second plurality of layers of the first annular wall.

7. The inter-turbine duct of claim 1, wherein the first vane comprises a silicon carbide composite.

8. The inter-turbine duct of claim 1, wherein the ceramic composite material comprises an aluminum oxide ceramic composite.

9. The inter-turbine duct of claim 1, wherein the first vane includes a first edge extending between the first end and the second end, and a second edge opposite the first edge, the first vane having a length defined between the first edge and the second edge, the flange having a length that is less than the length of the first vane, and the length of the flange is greater than a length of the slot.

10. An inter-turbine duct comprising:
a first annular wall including a first plurality of layers and a second plurality of layers each comprising a first ceramic material, the first plurality of layers including a plurality of slots defined through the first plurality of layers;
a second annular wall comprising a plurality of layers composed of a second ceramic material and including a plurality of openings defined through the plurality of layers and extending between an inner surface and an outer surface of the second annular wall; and
a plurality of vanes extending between the first annular wall and the second annular wall, each vane comprising a material selected from a group consisting of a metal alloy and a ceramic material, each vane having a first end, a second end opposite the first end, and a flange, the second end of each vane having a post extending through a corresponding opening of the plurality of openings of the second annular wall such that a slip joint is formed between the post and the corresponding opening of the plurality of openings of the second annular wall, the flange of each vane extending through a corresponding slot of the plurality of slots, the flange of each vane extending away from the first end of a corresponding vane and being retained between the first plurality of layers and the second plurality of layers of the first annular wall.

11. The inter-turbine duct of claim 10, wherein the first annular wall is an outer annular wall and the second annular wall is an inner annular wall.

12. The inter-turbine duct of claim 10, wherein the first annular wall is an inner annular wall and the second annular wall is an outer annular wall.

13. The inter-turbine duct of claim 10, wherein the first end of a vane of the plurality of vanes includes a post that extends from the flange, the second plurality of layers of the first annular wall defines an opening and the post extends through the opening of the second plurality of layers of the first annular wall and radially away from the first annular wall, the post configured to be received within a cylindrical space defined by a portion of an engine case.

14. The inter-turbine duct of claim 10, wherein the vane includes an internal cavity that extends from the first end of the vane to the second end of the vane, the internal cavity having an opening at the first end of the vane and the flange defines at least a portion of the first end of the vane.

15. The inter-turbine duct of claim 14, further comprising a retention insert disposed at least partially within the internal cavity of the vane and extending through an opening defined in the second plurality of layers of the first annular wall.

16. The inter-turbine duct of claim 10, wherein the plurality of vanes comprise a silicon carbide composite.

17. The inter-turbine duct of claim 10, wherein the first ceramic material comprises an aluminum oxide ceramic composite.

18. The inter-turbine duct of claim 10, wherein the plurality of vanes comprise the metal alloy.

* * * * *